United States Patent [19]

Kautt

[11] Patent Number: 5,143,271
[45] Date of Patent: Sep. 1, 1992

[54] DEVICE FOR ASSEMBLING THE PARTS INTERVENING ON A FACE-PLATE CORRESPONDING TO AN ESPAGNOLETTE OR BOLT LOCK FOR A SWINGING AND TILTING LEAF

[75] Inventor: Jean-Jacques Kautt, Strasbourg, France

[73] Assignee: Ferco International Usine de Ferrures de Batiment, Sarrebourg, France

[21] Appl. No.: 807,185

[22] Filed: Dec. 16, 1991

[30] Foreign Application Priority Data

Jan. 7, 1991 [FR] France .................................. 91 00176

[51] Int. Cl.$^5$ ........................ B23K 37/04; B23Q 7/00
[52] U.S. Cl. ..................................... 228/6.1; 228/10; 228/49.1; 29/281.5; 29/712; 29/792; 29/809
[58] Field of Search .................. 228/4.1, 6.1, 10, 49.1, 228/102, 182; 29/281.5, 709, 712, 792, 809

[56] References Cited

U.S. PATENT DOCUMENTS

| | | | |
|---|---|---|---|
| 3,159,128 | 12/1964 | Kodey, Jr. ............................ | 228/6.1 |
| 4,486,933 | 12/1984 | Iwase et al. ............................ | 29/809 |
| 4,672,742 | 6/1987 | Juan ..................................... | 228/49.1 |

FOREIGN PATENT DOCUMENTS 2589933  5/1987  France .

Primary Examiner—Samuel M. Heinrich
Attorney, Agent, or Firm—Sandler, Greenblum & Bernstein

[57] ABSTRACT

The invention relates to a device for assembling the parts intervening on a face-plate corresponding to an espagnolette or bolt lock for a swinging and tilting leaf. As a matter of fact, this face-plate receives, on its rear face intended for applying against the front edge of said leaf, at least one casing capable of accomodating a control mechanism for locking organs such as operating rods or the like and, on its front face oriented towards the sash-frame, at least one safety shoulder with a view to impeding the leaf from moving upwards when it is in tilting position. This assembling device comprises automatic means for the assembling by welding of the casing or casings and the safety shoulder onto these face-plates, these means grouping face-plate supplying means, handling means for arranging these face-plates one after another onto a step-by-step conveyer, means for positioning these face-plates with respect to each station for the assembling by welding, as well as means for supplying casings or safety shoulders, means for checking the presence of these latter and means for positioning and holding, before welding, these casings or these safety shoulders.

12 Claims, 2 Drawing Sheets

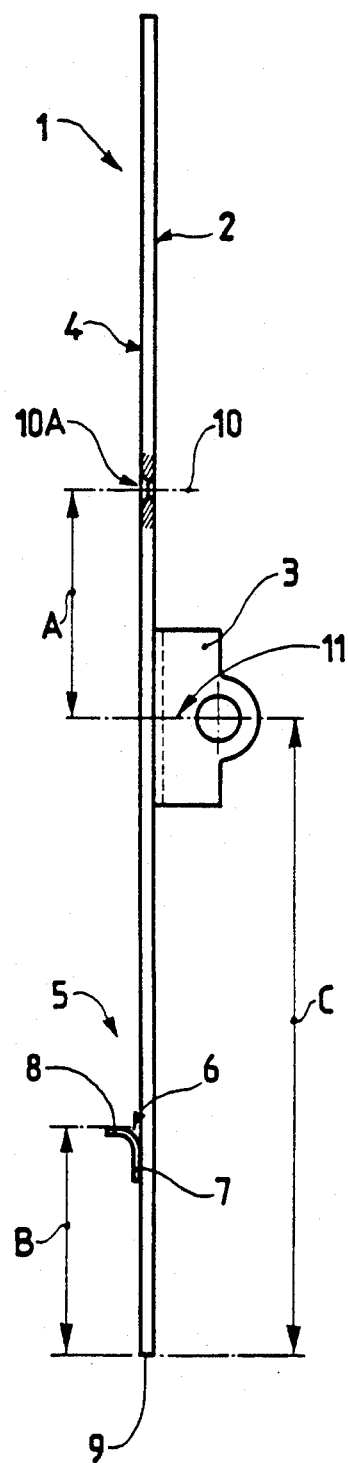
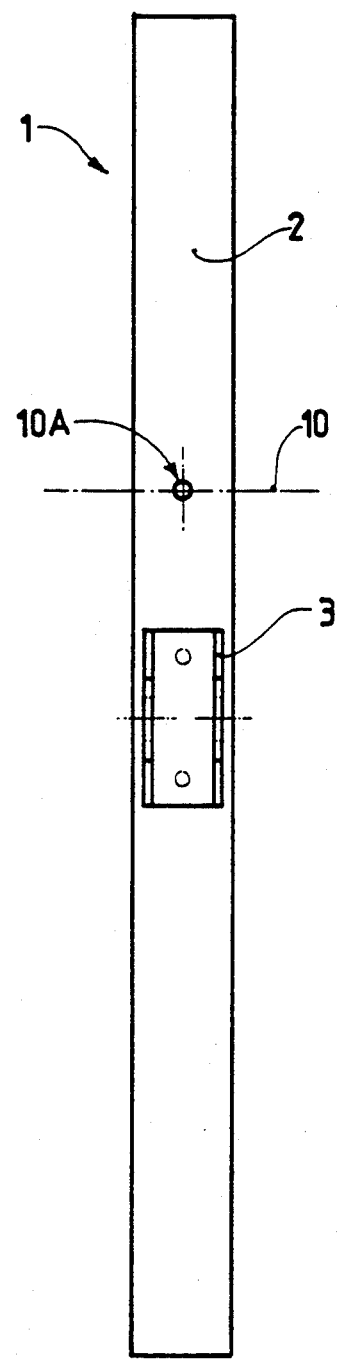
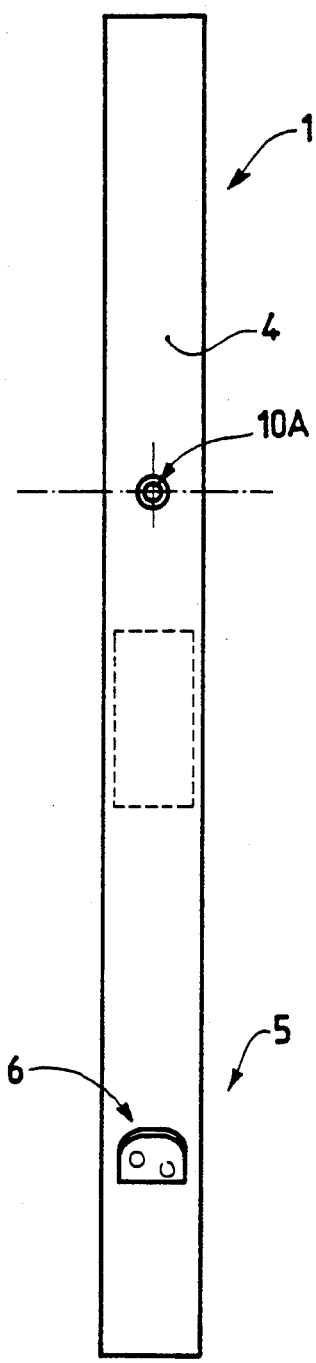

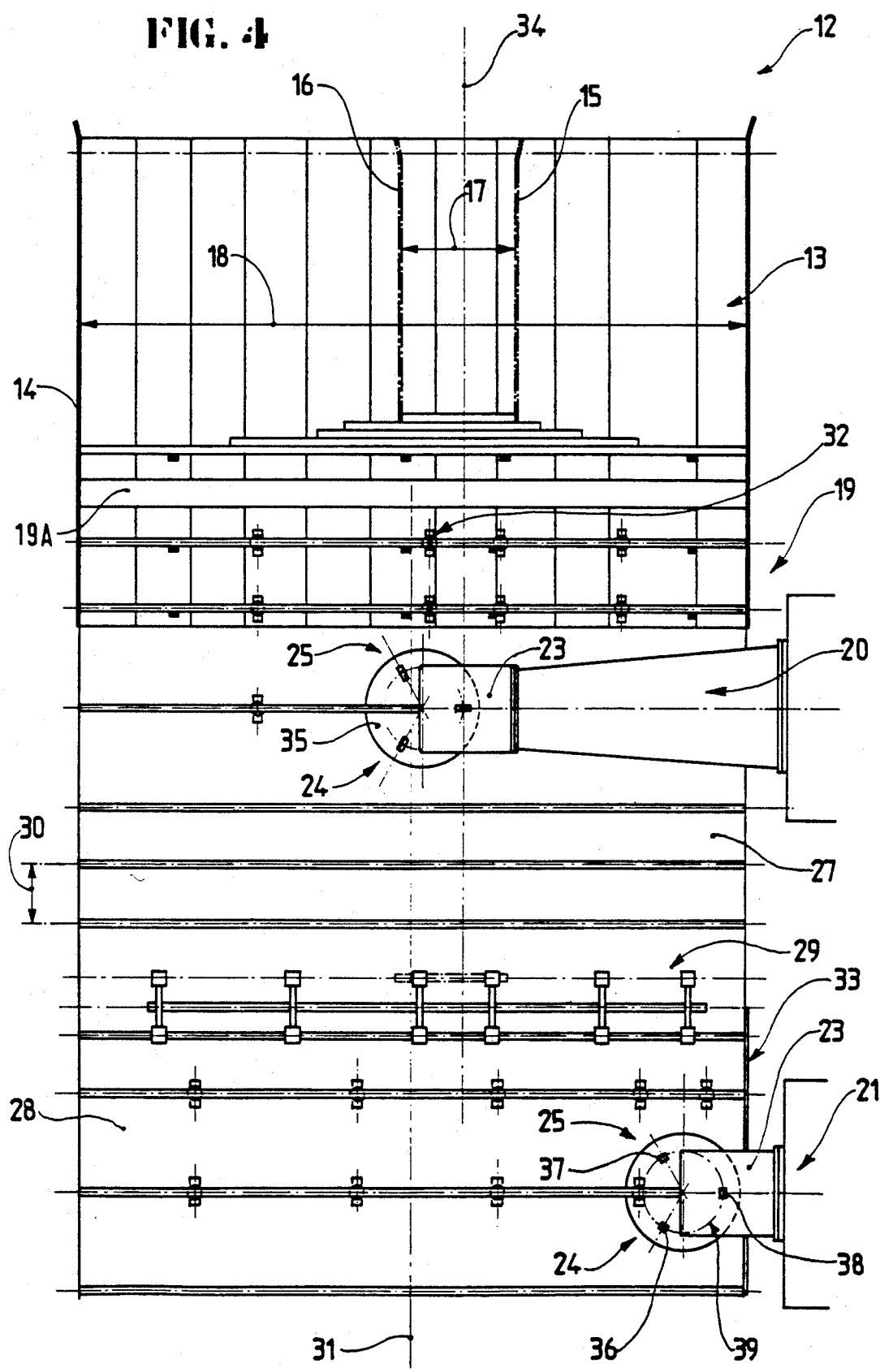

DEVICE FOR ASSEMBLING THE PARTS INTERVENING ON A FACE-PLATE CORRESPONDING TO AN ESPAGNOLETTE OR BOLT LOCK FOR A SWINGING AND TILTING LEAF

This invention relates to a device for assembling the parts intervening on a face-plate corresponding to an espagnolette or bolt lock for a swinging and tilting leaf, said face-plate receiving, on its rear face intended for being applied onto the front edge of said leaf, at least a casing capable of accomodating a control mechanism for locking organs such as operating rods or the like and, on its front face oriented towards the sash-frame, at least a safety shoulder, formed of a square-iron-shaped part, capable of co-operating with a keeper or the like with a view to impeding the leaf from moving upwards when it is in tilting position.

This invention is intended for the manufacturers of automatic machines intended, more particularly, for assembling constituent parts of locking fittings.

As a matter of fact, the problem this invention deals with resides in that on face-plates, viz. for espagnolettes or bolt locks for swinging and tilting leaves, are to be inserted, more particularly, by welding, on the one hand, at least a casing intended for accomodating, later on, a control mechanism through which it should be possible to actuate a locking organ such as an operating rod or the like and, on the other hand, at least a safety shoulder, this latter being fixed onto the outer face of the face-plate, in order to co-operate with a keeper or the like arranged on the sash-frame and to thus impede any upward movement one would have a tendency to confer to the leaf when same is in tilting position.

As a matter of fact, the assembling of the parts required on such a face-plate for an espagnolette or bolt lock was hitherto carried out with means which could be qualified as manual means, in that they required an important intervention by qualified operators.

It is indeed convenient to take into consideration that said face-plates can have various sizes, which arises the problem of determining the position of those parts which form the casing or casings and the safety shoulder on these face-plates.

As a matter of fact, there is already known, namely from Fr-A-2,589,933, an equipment for assembling various parts of a fitting such as a bolt lock for windows, doors or the like which device allows, as a matter of fact, to intervene onto fittings of different sizes.

Thus and in order to meet the above requirements, this known equipment comprises a step-by-step conveyer onto which is laid down, at regular intervals, the first member intended for forming said fitting and this is often the face-plate. This equipment furthermore comprises, for each part to be assembled, at least one assembling station arranged according to a reference plane conferred to the fitting.

More particularly, in order to meet the requirement of assembling fittings of different sizes, this equipment also comprises, combined with means for the feeding along the longitudinal axis of the conveyer, cross-feed means capable of conferring to the fitting, onto which are mounted the various parts, a bidirectional path, this fitting thus being capable of co-operating with distinct positioning references according to the assembling stations.

As a matter of fact and throughout this equipment, it is enough, in order to adapt same to fittings of different sizes, to modify, at the level of the assembling stations concerned, the positioning references, viz. when they actually depend on the size of said fitting.

As already stated above, in the case of this equipment, the various assembling stations are arranged according to a reference plane. This is, in this case, the median plane of the casing, intended for accomodating the central control mechanism of the espagnolette or bolt lock and which is affixed to the back face of the face-plate, forming the main member of the fitting and, therefore, receiving all the other parts throughout the assembling equipment.

This reference plane can however be choosen only in the event the face-plate is effetively pre-fitted with the casing. The equipment will indeed be able to position the face-plate with respect to this reference plane only through the presence of said casing.

Consequently, this equipment can in no case intervene on face-plates not fitted with such a casing.

Furthermore, it should be observed that, in the event of assembling by mere fitment or even by riveting, it is particularly easy to position the various parts with respect to each other, viz. because of the configuration of these parts allowing this fitment or even thanks to the presence of a stud or the like allowing the riveting. Now, this is not at all the case in the event of a fixing by welding. In these circumstances, the parts to be welded are indeed generally without organs allowing their positioning with respect to each other before ensuring their assembling. This is viz. true when mounting a casing or a safety shoulder onto a face-plate.

As a matter of fact, the welding imposes the association and the holding of the parts to be welded above the welding station. Each of these parts must furthermore be kept separated through organs which allow to finally guarantee their positioning with respect to each other at the time of welding.

In short, this requirement is to be considered as the more complex and difficult to be met as it is known that the mounting by welding must be conducted with a very high accuracy and this irrespective of the length of the fitting considered.

This invention now proposes to bring a solution for all the above-mentioned problems.

To this end, the invention relates to a device for assembling the parts intervening on a face-plate corresponding to an espagnolette or bolt lock for a swinging and tilting leaf, said face-plate receiving, on its rear face intended for being applied onto the front edge of said leaf, at least a casing capable of accomodating a control mechanism for locking organs such as operating rods or the like and, on its front face oriented towards the sash-frame, at least a safety shoulder, formed by a square-shaped part, capable of co-operating with a keeper or the like with a view to impeding the leaf from moving upwards when it is in tilting position, this device comprising automatic means for the assembling by welding of the casing or casings and the safety shoulder onto the face-plate of an espagnolette or bolt lock, these automatic assembling means having, in combination:

face-plate supplying means, handling means for arranging said face-plates one after another and transversally onto a step-by-step conveyer, means for positioning the face-plates with respect to a station for the assembling by welding of a casing and this through a reference plane located close to the median plane of the position of the casing on said face-plate, means for positioning said face-plates with respect to a station for the assembling by welding of a safety shoulder, according to a second reference plane present on said face-plates close to the position on this latter of said safety shoulder, said stations for the assembling by welding of the casing or casings and the safety shoulder being fixedly arranged with respect to the conveyer and integrating means for supplying casings and safety shoulders, means for checking the presence of these latter and means for positioning and holding, before welding, these casings or these safety shoulders.

According to another feature of the invention, the supply means, the means for checking the presence of the parts and the means for positioning and holding, before welding, these casings or these safety shoulders, at the level of a station for assembling by welding, are arranged above the conveyer, such an arrangement substantially reducing the overall size of the assembling device.

The advantages resulting from this invention mainly reside in that it is possible to have now a tool at the disposal which is capable of ensuring automatic assembling by welding of the parts intervening on a face-plate irrespective of the length of this latter and this with a perfect accuracy.

BRIEF DESCRIPTION OF THE DRAWINGS

FIG. 1 is a schematic elevation view of a face-plate for an espagnolette or bolt lock comprising, at the level of its rear face, at least a casing and, at the level of its front face, a safety shoulder, FIG. 2 is a right view of FIG. 1, FIG. 3 is a left view of FIG. 1, FIG. 4 is a schematical plan view of the device according to the invention for assembling the parts intervening on a face-plate for espagnolettes or bolt locks.

This invention relates to the assembling of a face-plate 1, such as shown in the FIGS. 1 thru 3 and corresponding more particularly to an espagnolette or bolt lock for swinging and tilting leaves for doors, windows or the like.

As a matter of fact, such a face-plate 1, which is in the form of a long-limbed metallic flat iron, comprises, at the level of its rear face 2 intended for being applied against the front edge of said swinging and tilting leaf, at least one casing 3 in which will be arranged the control mechanisms either of operating rods or of any other locking organ such as a catch or the like.

As a matter of fact, within the framework of the drawings, there has been shown a face-plate 1 comprising only one casing 3 intended, more particularly, for containing the central control mechanism of the espagnolette or bolt lock. It should however be understood that the method and the means, which will be set forth below, for assembling this central casing 2 onto the face-plate 1 can be applied in a substantially identical way to other casings which would eventually be distributed over the full height of said face-plate.

This latter is furthermore provided, on its front face 4 and in its lower portion 5, with a safety shoulder 6 in the form of a part having approximately a square-iron shape and therefore comprising a wing 7 applying against said front face 4 of the face-plate 1 and a wing 8 substantially perpendicular to this latter. It should be noticed, in this respect, that said wing 8 of the safety shoulder 6 has a slightly convex shape.

As a matter of fact, it should be stated that the function of such a safety shoulder 6 is, viz., through its perpendicular wing 8, to co-operate with a keeper (not shown) arranged on the sash-frame of the door, window or the like, in order to avoid an eventual upward movement of the leaf which it would be possible to confer to same, more particularly when same is in a tilting position.

More particularly, during a tilted opening, the leaf pivots about a horizontal axis which is substantially materialized by its lower rail. This rotation of the leaf goes together with a displacement of the perpendicular wing 8, corresponding to the safety shoulder 6, in its keeper located at the level of the sash-frame. This explains indeed the curvilinear shape of this perpendicular wing 8. However, in such a position of the leaf, this safety shoulder 6 is kept in this keeper on the sash-frame, so that the leaf, which is then released in its upper portion with respect to the sash-frame, cannot disengage from the lower hinging means due to a pressure which would be unexpectedly applied onto same.

As a matter of fact, both the casing 3 and the safety shoulder 6 are inserted onto the face-plate 1 by welding. However, during this welding, it is of course convenient to perfectly position the casing or casings as well as this safety shoulder on said face-plate 1.

More particularly, this positioning is generally determined from the lower edge 9 of the face-plate 1. Thus, although it is true that measure B at which is located the safety shoulder 6 with respect to this lower edge 9 of the face-plate 1 does not vary, the same does not apply to the measure C at which is located a casing 3 with respect to said lower edge 9. This measure C indeed depends, on the one hand, on the casing considered and, on the other hand, on the size of the face-plate 1. Of course, this measure C is theoretically known, but cannot be used during manufacturing. It is indeed very often difficult, if not impossible, to achieve a sufficient accuracy when transferring this measure C, of a generally important modulus, onto a face-plate which is very flexible and seldom kept strictly rectilinear, even when arranged on a flat surface.

The only moment at which this face-plate 1 is kept strictly flat is during its manufacturing by cutting and deep-drawing out of a sheet.

Therefore, it is preconized, according to the invention, to provide, when manufacturing the face-plate 1, a reference plane 10 which is located at a small distance from the median position 11 of a casing 3 (any whatsoever) intended for being affixed to the face-plate 1. Such a reference plane can thus easily be used and allows to achieve the desired accuracy when assembling by welding. In addition, measure A, which corresponds to the distance between the reference plane 10 and said median position 11 of the casing 3, is preferably a constant for each kind of face-plate and for a given casing.

Advantageously, such a reference plane 10 can be an opening 10A made in the face-plate 1 when deep-drawing and cutting this latter, this opening 10A finding its usefulness later on, i.e. the fixing of said face-plate onto the front edge of a leaf of a door, window or the like.

It is just through this or these reference plane(s) 10 provided close to this or these casing(s) 3, as well as through the reference plane formed by the lower edge 9 of the face-plate 1, that the assembling device, the description of which will follow, allows to achieve a highly accurate mounting of this or these casing(s) 3, as well as of the safety shoulder 6 onto such a face-plate 1 for espagnolettes or bolt locks for swinging and tilting leaves.

As shown in FIG. 4, this assembling device 12 comprises means 13 for supplying face-plates 1 formed, for instance, of a feed ramp 14 onto which said face-plates are laid down horizontally and in a same direction, i.e. either their rear face 2 or their front face 3 is systematically oriented upwards. These face-plates 1 are thus juxtaposed on said feed ramp 14 and are positioned on this latter through guiding rails 15, 16 keeping between them a distance 17 corresponding to the length of the kind of face-plates being mounted.

It should be noted, in this respect, that since the assembling device according to this invention can be used for any kind of face-plates 1, the feed ramp 14 preferably comprises a total width 18 at least equal to the largest length which may have a face-plate 1. It is just to show this that on the feed ramp 14 shown il FIG. 4 have been arranged face-plates 1 of different lengths. The position of the guiding rails 15, 16 must however be adapted to each series of face-plates handled.

This assembling device 12 is furthermore provided with means 19A such as a manipulator intended for taking the face-plates 1 one by one off the feed ramp 14 in order to successively arrange them in dogs and transversally on a conveyer 19 subjected to a step-by-step feed motion.

As a matter of fact, the conveyer 19 is equipped with at least two stations 20, 21 for assembling by welding, one of which will serve for the mounting of a casing 3 onto the face-plates 1, while the second assembling station 21 will ensure the welding of the safety shoulder 6.

According to a feature of this invention, these assembling stations 20, 21 are fixed onto the conveyer 19, In addition, they group as well welding means 23 as supply means 24 and means 25 for checking the presence of a casing 3 or a safety shoulder 6.

These assembling stations 20, 21 are also provided with means for holding and positioning a casing 3 or a safety shoulder 6 with respect to a face-plate 1 prior to welding.

As a matter of fact, the grouping of these various means 23, 24, 25 at the level of the assembling stations 20, 21 is bound to the fact that these latter, and more particularly the welding means 23, should take a definite position on the conveyer 19 in order to guarantee the accuracies looked for.

However, these means 23, 24, 25 confer to these assembling stations 20, 21 a relatively important size and weight. It is therefore preconized, according to the invention, to arrange the means 24 for supplying the casings 3 or the safety shoulders 6 as well as the means 25 for checking the presence of either of these parts and the means for holding and positioning said parts prior to welding under the conveyer 19. Such an arrangement avoids the installation of large-size rigs above the conveyer 19 and hence leads to a reduced cost of the assembling device according to the invention. However and because of the above-mentioned, it is absolutely necessary for said face-plates 1 to lay on the conveyer 19 with their rear face 2 oriented downwards when arriving at the station 20 for the assembling by welding of a casing 3. While, when they near the station 21 for the assembling by welding of the safety shoulder 6, these face-plates 1 should be arranged so that their front face 4 then be oriented downwards.

Thus, according to the first station 20, 21 for assembling by welding met, the function of the manipulator 19A arranged between the conveyer 19 and the feed ramp 14 will be to take off the face-plates 1 at the level of this latter, then to arrange them in the appropriate direction in the dogs provided for on said conveyer 19. Furthermore, this latter may be comprised of two conveyer belts 27, 28 located in the extension of each other, one 27 of these conveyer belts grouping the station or stations 20 for the assembling by welding of a casing 3, while the other conveyer belt 28 is provided with the station 21 for the assembling by welding of the safety shoulder 6. Between these conveyer belts 27, 28 are then inserted means 29 for turning the face-plates 1 upside down.

However and according to another embodiment, such turning means 29 may be arranged on a conveyer comprised of one single conveyer belt and this between a station 20 for the assembling by welding of casings 3 and a station 21 for the assembling by welding of safety shoulders 6 arranged after each other. More particularly, such turning means 29 thus take a face-plate off its dogs during a stop of said conveyer 19, then lay down this face-plate in the same dogs in which it laid before, but in a position turned by 180 degrees and this after said conveyer 19 has been fed by one step 30.

As already stated above, there exists a distinct reference plane 9, 10 according to whether it is desired to position a safety shoulder 6 or a casing 3, respectively, on a face-plate 1. Therefore, with each station 20, 21 for assembling by welding are associated means 32, 33 in order to perfectly position the face-plates 1 with respect to these reference planes 10.

As a matter of fact, the location of these assembling stations 20, 21 on the conveyer 19 is determined as a function of a reference plane 34 which may be either the longitudinal median plane 31 of the conveyer 19 or the median plane of the central casing 3 which a face-plate 1 is fitted with. It should be noticed, in this respect, that such a reference plane 34, corresponding to the median plane of the central casing 3 of a face-plate 1, is easy to be determined through the reference plane 10 which forms the opening 10A and the constant measure A.

Thus, these assembling stations 20, 21 are arranged on the conveyer 19 in correspondance with the face-plates comprising the reference planes 10, 9 of the casings 3 or the safety shoulders 6 farthest away from this reference plane 34.

If one considers for example the station 21 for the assembling by welding of the safety shoulder 6, it will be placed on the conveyer 19 so that it corresponds to the face-plate having the largest length since same has the reference plane 9 farthest away from the reference plane 34. This reasoning applies to all further casings a face-plate 1 may be fitted with.

In addition, the assembling device 12 is fitted, at least between two successive assembling stations 20, 21 or at the level of each of them, with means for the cross-feed of the face-plates 1 on the conveyer 19.

As a matter of fact, such cross-feed means, which may have any shape whatsoever and are therefore not shown in the drawings, are intended for having the face-plates 1 co-operate with the positioning means 32, 33 corresponding to each of the assembling stations 20, 21.

These positioning means 32, 33 may be formed, according to the case, by a dog provided for at the level of the conveyer 19 and provided with a conical awl which engages into the opening 10A forming the reference plane 10 corresponding to a casing 3 or even by a guiding ramp against which strikes the lower edge 9 of said face-plates 1. It should be noted, in this respect, that the assembling device 12 may be fitted with one or several checking stations capable of checking whether a face-plate 1 is perfectly positioned with respect to the assembling stations 20, 21. By way of an example, checking means which identify the position of the reference plane 10 with respect to the positioning means 32 may be formed by optical detectors or probes. Furthermore, the checking means may also be in the form of a device capable of pushing back or, more particularly, retaining the face-plates 1 at the level of their lower edge 9 against the positioning means 33 formed by a guiding ramp.

The assembling stations 20, 21 furthermore comprise a rotary table 35 arranged, more particularly, under the conveyer 19 and comprising at least three different locations 36, 37, 38 distributed over a circle 39 and intended for receiving either casings 3 or safety shoulders 6.

This table 35 is provided, at the level of these different locations 36, 37, 38, with said positioning and holding means which may be formed by any gripping means whatsoever and will ensure the taking over of either a casing 3 or a safety shoulder 6 in order to bring same in front of the welding means 23 and to guarantee its perfect positioning, prior to welding, on the face-plate 1 which comes, at that very moment, opposite the assembling station 20, 21.

As a matter of fact, at each rotation sequence of the rotary table 35, to which corresponds the feed by one step 30 of the conveyer 19, a location 36 comes in front of the supply means 34 through which it receives a casing 3 or a safety shoulder 6, whereas a second location 37 comes opposite the checking means 25 which check the presence or absence of a casing 3 or a safety shoulder 6. Finally, another location 38 arrives opposite the welding means 23.

More particularly, during the sequence of stopping of the conveyer 19 and of this rotary table 25, the casing 3 or the safety shoulder 6 located at the location 38 is perfectly positioned on the face-plate 1. Then intervene the welding means 23 substantially formed of two electrodes arranged on either side of the conveyer 19, respectively, in order to weld this casing 3 or this safety shoulder 5 onto said face-plate 1.

Of course, between each assembling station 20, 21 may also be installed means for checking the presence as well as the positioning of the part or parts which have previously been welded onto the face-plate.

Finally, one understands from the above description that the assembling device according to the invention allows, through specific reference planes, to meet the accuracy requirements for the welding of the parts such as casings or safety shoulder onto a face-plate of an espagnolette or bolt lock for a swinging and tilting leaf. This invention has thus been able to efficiently solve the problem experienced hitherto in this particular field.

I claim:

1. Device for assembling the parts intervening on a face-plate corresponding to an espagnolette or bolt lock for a door, window or the like comprised of a sash-frame and a swinging and tilting leaf, this leaf having a front edge onto which is applied said face-plate (1), this latter comprising a front face (4) oriented towards the sash-frame and onto which is inserted a safety shoulder (6), formed by a square-shaped part, capable of cooperating with a keeper or the like arranged on the sash-frame with a view to impeding the leaf from moving upwards when it is in tilting position, said face-plate furthermore comprising a rear face (2) intended for being applied against the front edge of said leaf and onto which is fixed at least one casing (3) capable of accomodating a control mechanism for locking organs such as operating rods or the like, this device comprising automatic means for the assembling by welding of the casing or casings (3) and the safety shoulder (6) onto the face-plate (1), these automatic assembling means being comprised of:

face-plate supplying means (13),
    handling means (19A) for arranging said face-plates (1) one after another and transversally onto a step-by-step conveyer (19),
    means (32) for positioning the face-plates (1) with respect to a station (20) for the assembling by welding of a casing (3) and this through a reference plane (10) located close to the median plane (11) of the position of said casing (3) on said face-plate (1),
    means (33) for positioning said face-plates (1) with respect to a station (21) for the assembling by welding of a safety shoulder (6) according to a reference plane (9) present on said face-plates (1) close to the position on this latter of said safety shoulder (6),
    said stations (20, 21) for the assembling by welding of the casing or casings (3) and the safety shoulder (6), respectively, being fixedly arranged with respect to the conveyer (19) and integrating means (24) for supplying casings (3) and safety shoulders (6), means (25) for checking the presence of these latter and means for positioning and holding, before welding, these casings (3) or these safety shoulders (6).

2. Assembling device according to claim 1, the supply means (24), the means (25) for checking the presence of the parts and the means for positioning and holding, before welding, the casings (3) or the safety shoulders (6) of which, at the level of a sation for assembling by welding (20, 21), are arranged above the conveyer (19).

3. Assembling device according to claim 1, comprising means (13) for supplying face-plates (1) formed by a feed ramp (14) on which are horizontally arranged said face-plates (1) in a same direction, so that either their rear face (2) or their front face (4) be systematically oriented upwards, these face-plates (1) being positioned on this feed ramp (14) through guiding rails (15, 16) keeping between each other a distance (17) corresponding to the length of said face-plates (1), this feed ramp (14) comprising a total width (18) at least equal to the largest length which may have a face-plate (1).

4. Assembling device according to claim 1, the reference plane (10) of which, with respect to which the positioning means (32) ensure the positioning of the face-plates (1) with respect to a station (20) for the assembling by welding of a casing (3), is formed by an opening (10A) made at a constant measure A from the median plane (11) of the position of said casing (3) on said face-plate (1).

5. Assembling device according to claim 1, comprising means (32) for positioning the face-plates (1) with respect to a station (20) for the assembling by welding of a casing (3) and this through a reference plane (10)

located close to the median plane (11) of the position of said casing (3) on the face-plate (1), these positioning means (32) being formed by a awl made at the level of the dogs provided for on the step-by-step conveyer (19), such an awl engaging into an opening (10A) forming the reference plane (10) for positioning the face-plate (1) with respect to a station (20) for the assembling by welding of a casing (3).

6. Device for assembling the parts intervening on a face-plate according to claim 1, face-plate comprising, on its front face (4) oriented towards the sash-frame, at least a safety shoulder (6), this face-plate being furthermore provided with a lower edge located close to the position of said safety shoulder (6) on said face-plate (1), this lower edge forming the reference plane (9) with respect to which the positioning means (33) position said face-plates (1) on the conveyer (19) at the level of the station (21) for the assembling by welding of the safety shoulder (6).

7. Assembling device according to claim 6, comprising means (33) for positioning said face-plates (1) with respect to a station (21) for the assembling by welding of a safety shoulder (6) according to a reference plane (9) present on said face-plates (1) and formed by the lower edge, located close to the position of said safety shoulder (6), of these face-plates (1), these positioning means (33) being formed by a guiding ramp provided for on the conveyer (19) and against which strikes said lower edge (9) of the face-plates (1) opposite the station (21) for the assembling by welding of the safety shoulder (6).

8. Assembling device according to claim 1, the stations for assembling by welding (20, 21) of which comprise a rotary table (35) having at least three distinct locations (36, 37, 38) distributed over a circle (39) and intended for receiving either casings (3) or safety shoulders (6), at the level of each of these locations (36, 37, 38) being provided for means for positioning and holding, before welding, a casing (3) or a safety shoulder (6).

9. Assembling device according to claim 8, the rotary table (35) of which, at the level of a station (20, 21) for assembling by welding, carries out rotation sequences, so that each rotation sequence corresponds to the feed by one step (30) of the conveyer (19) and that a location (36) comes in front of the supply means (24) through which it receives a casing (3) or a safety shoulder (6), that a second location (37) comes opposite checking means (25) checking the presence or absence of a casing (3) or a safety shoulder (6) and that another location (38) arrives under the welding means (23).

10. Assembling device according to claim 1, comprising a station for the assembling by welding of a casing (3) and a station for the assembling by welding of a safety shoulder (6) between which are installed, on the conveyer (19), means (29) for turning the face-plates (1) upside down.

11. Assembling device according to claim 1, comprising two successive stations for assembling by welding between which are installed means for cross-feeding of the face-plates (1), so as to have the reference planes (10, 9) of same co-operate with the positioning means (32, 33) corresponding to each of said stations (20, 21) for assembling by welding.

12. Assembling device according to claim 1, comprising one or several checking stations arranged before each station (20, 21) for assembling by welding in order to check the positioning of the face-plates (1) with respect to the positioning means (32, 33).

* * * * *